United States Patent
Ramakrishnan et al.

(10) Patent No.: US 12,377,954 B2
(45) Date of Patent: Aug. 5, 2025

(54) AIRCRAFT HAVING AN AIRCRAFT BODY INCLUDING A FEATURE

(71) Applicant: General Electric Company, Schenectady, NY (US)

(72) Inventors: Kishore Ramakrishnan, Rexford, NY (US); Shourya Otta, Niskayuna, NY (US); Trevor Wood, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/826,276

(22) Filed: May 27, 2022

(65) Prior Publication Data

US 2022/0281583 A1    Sep. 8, 2022

Related U.S. Application Data

(63) Continuation of application No. 15/879,488, filed on Jan. 25, 2018, now abandoned.

(51) Int. Cl.
*B64C 1/40* (2006.01)
*B64D 27/14* (2006.01)
*B64D 27/00* (2006.01)
*B64D 27/20* (2006.01)

(52) U.S. Cl.
CPC .............. *B64C 1/40* (2013.01); *B64D 27/14* (2013.01); *B64C 2220/00* (2013.01); *B64D 27/00* (2013.01); *B64D 27/20* (2013.01)

(58) Field of Classification Search
CPC ......... B64C 2220/00; B64C 1/34; B64C 1/40; B64C 23/06; B64C 5/12; B64C 7/00; B64C 21/00; B64C 23/005; B64C 1/38; B64C 1/0009; B64D 27/06
USPC ........................................................ 244/130
See application file for complete search history.

(56) References Cited

U.S. PATENT DOCUMENTS

| | | | |
|---|---|---|---|
| 1,714,416 A * | 5/1929 | Giuseppe Cannistra | ................... B64C 35/00 244/101 |
| 1,871,015 A * | 8/1932 | Squires | .................. B64D 27/06 244/55 |
| 2,532,753 A | 12/1950 | Beman | |
| 2,581,625 A * | 1/1952 | Brady | ..................... B64C 11/00 244/119 |

(Continued)

FOREIGN PATENT DOCUMENTS

| | | |
|---|---|---|
| CN | 103174465 A | 6/2013 |
| CN | 106794899 A | 5/2017 |

(Continued)

*Primary Examiner* — Christopher D Hutchens
(74) *Attorney, Agent, or Firm* — McGarry Bair PC

(57) ABSTRACT

An aircraft having a fuselage, an aircraft body, at least one aircraft engine system and a feature. The fuselage defining a longitudinal centerline. The at least one aircraft engine system defining an axial centerline. The at least one aircraft engine system having a nacelle and at least one rotatable propeller. The at least one rotatable propeller having a free end that is spaced radially outward from the nacelle with respect to the axial centerline. The feature shaped to alter a flow of air between the aircraft body and the at least one rotatable propeller. The feature having a continuous rounded contour when viewed along a vertical plane normal to the longitudinal centerline and intersecting the feature.

20 Claims, 8 Drawing Sheets

(56) References Cited

U.S. PATENT DOCUMENTS

| | | | | |
|---|---|---|---|---|
| 2,927,749 | A * | 3/1960 | Brownell | B64C 7/00 244/45 R |
| 2,929,586 | A * | 3/1960 | Hurd, Jr. | B64C 11/00 181/207 |
| 3,618,699 | A | 11/1971 | Evans et al. | |
| 3,693,913 | A * | 9/1972 | Barland, Sr. | B64C 7/00 244/130 |
| 4,318,328 | A * | 3/1982 | Rona | B64D 7/08 244/130 |
| 4,815,995 | A * | 3/1989 | Ingvason | B63B 39/005 440/66 |
| 4,966,338 | A * | 10/1990 | Gordon | B64D 29/04 244/54 |
| 4,976,396 | A * | 12/1990 | Carlson | B64C 1/16 244/119 |
| 5,069,397 | A * | 12/1991 | Haslund | B64C 21/04 372/104 |
| 5,326,050 | A * | 7/1994 | Zell | B64C 5/12 244/99.1 |
| 5,551,649 | A | 9/1996 | Kaptein | |
| 5,918,834 | A * | 7/1999 | Sommer | H01Q 1/427 343/705 |
| 5,988,568 | A | 11/1999 | Drews | |
| 6,478,253 | B1 | 11/2002 | Seidel | |
| 6,742,741 | B1 * | 6/2004 | Rivoli | B64U 20/70 244/93 |
| 7,118,071 | B2 * | 10/2006 | Bogue | B64C 27/467 244/75.1 |
| 7,739,865 | B2 | 6/2010 | Prasad et al. | |
| 8,074,938 | B2 * | 12/2011 | Hyde | B64C 21/10 244/130 |
| 8,302,912 | B2 | 11/2012 | Wood | |
| 8,485,472 | B2 * | 7/2013 | Suchy | B64C 7/00 244/130 |
| 9,102,397 | B2 | 8/2015 | Wood | |
| 9,334,045 | B2 | 5/2016 | Wood | |
| 9,463,870 | B2 | 10/2016 | Wood | |
| 9,630,702 | B2 | 4/2017 | Alonso-Miralles et al. | |
| 9,725,155 | B2 | 8/2017 | Miller et al. | |
| 9,758,237 | B2 * | 9/2017 | Blanchard | B64C 7/00 |
| 9,868,507 | B2 * | 1/2018 | Meier | B64C 27/02 |
| 10,648,455 | B2 | 5/2020 | Luchsinger et al. | |
| 10,714,069 | B1 | 7/2020 | Ratner | |
| 10,723,434 | B2 | 7/2020 | Gruber et al. | |
| 2003/0168552 | A1 | 9/2003 | Brown | |
| 2005/0011993 | A1 * | 1/2005 | Konings | B64C 7/02 244/198 |
| 2005/0274103 | A1 | 12/2005 | Prasad et al. | |
| 2007/0272796 | A1 | 11/2007 | Stuhr | |
| 2009/0045287 | A1 | 2/2009 | Belleville | |
| 2010/0038492 | A1 * | 2/2010 | Sclafani | B64C 23/06 244/199.1 |
| 2010/0301171 | A1 | 12/2010 | Wood | |
| 2010/0308169 | A1 * | 12/2010 | Blanchard | B29C 70/86 244/130 |
| 2011/0277447 | A1 | 11/2011 | Sturmer | |
| 2012/0112011 | A1 * | 5/2012 | Emunds | B64C 7/00 244/201 |
| 2014/0183301 | A1 * | 7/2014 | Mora | B64C 7/00 244/118.1 |
| 2014/0374566 | A1 * | 12/2014 | Fernando | B64C 21/10 248/554 |
| 2015/0086335 | A1 | 3/2015 | Merlo et al. | |
| 2015/0125268 | A1 | 5/2015 | Koopmann et al. | |
| 2015/0360790 | A1 | 12/2015 | Rouyre | |
| 2015/0361885 | A1 | 12/2015 | Romano et al. | |
| 2016/0305271 | A1 | 10/2016 | Schmidt et al. | |
| 2017/0152019 | A1 | 6/2017 | Wood et al. | |
| 2017/0225773 | A1 | 8/2017 | Wood | |
| 2018/0258856 | A1 | 9/2018 | Schwartz et al. | |
| 2018/0290727 | A1 * | 10/2018 | Bays-Muchmore | B64C 3/10 |
| 2019/0061963 | A1 | 2/2019 | Sankrithi | |
| 2020/0335077 | A1 | 10/2020 | Ratner | |
| 2020/0369398 | A1 * | 11/2020 | Philipp | B64C 5/06 |

FOREIGN PATENT DOCUMENTS

| | | |
|---|---|---|
| EP | 2371708 A2 | 10/2011 |
| EP | 2452877 A2 | 5/2012 |
| EP | 3187411 A1 | 7/2014 |
| FR | 2949754 A1 | 3/2011 |
| JP | S62194993 A | 8/1987 |
| JP | H08188192 A | 7/1996 |
| WO | 2011017071 A2 | 2/2011 |
| WO | 2015166430 A1 | 11/2015 |

* cited by examiner

AIRCRAFT HAVING AN AIRCRAFT BODY INCLUDING A FEATURE

CROSS-REFERENCE TO RELATED APPLICATIONS

This application is a continuation of and claims priority to U.S. application Ser. No. 15/879,488, filed Jan. 25, 2018, the contents of which are incorporated herein by reference.

FIELD

The subject matter described herein relates to an aircraft having an aircraft body, specifically, to a feature formed along the aircraft body.

BACKGROUND

During operation of a turboprop engine system, the rotation of the propeller airfoils through air generates aerodynamic noise. The aerodynamic noise may be caused by propeller loading due to aircraft installation effects, the distance between the propeller tip and the fuselage, the direction of propagation of the acoustic wave relative to the fuselage or relative to alternative direction, or the like. For example, the aerodynamic noise may be observed as audible tones, "swooshing," or periodic pulsing sounds that are typically heard in the near field of the engine system (e.g., the area directly around the engine system).

However, under certain conditions, the aerodynamic noise may be heard in the far field (e.g., locations a certain distance away from the turboprop engine). Geographical areas (e.g., cities, counties, states, or the like) may have noise ordinances to which the aircrafts must adhere to during cruise, take-off, or landing, or passengers in an aircraft system may hear the aerodynamic noise generated by the turboprop engine system and thus, the noise is seen as a nuisance or discomfort to the aircraft passengers.

BRIEF DESCRIPTION

In one embodiment, a system comprises plural airfoils operably coupled with a rotatable member of an aircraft engine system. The rotatable member is configured to rotate about an axial centerline of the aircraft engine system. The system comprises a feature at one or more exterior locations of an aircraft body. The feature is shaped to alter a flow of air between the aircraft body and the airfoils. Altering the flow of air also one or more of reduces a local load on the airfoils, reduces a local angle of attack of the airfoils, or reduces a noise level that is generated by the aircraft engine system as the rotatable member rotates about the axial centerline of the aircraft engine system relative to the aircraft body not including the feature.

In one embodiment, a system comprises one or more processors configured to determine a local load on plural airfoils. The airfoils are operably coupled with a rotatable member of an aircraft engine system. The rotatable member is configured to rotate about an axial centerline of the aircraft engine system. The one or more processors are also configured to determine a local angle of attack of the airfoils as air flows around the airfoils and the rotatable member rotates about the axial centerline of the aircraft engine system. The system also comprises a feature at one or more exterior locations of an aircraft body based on the local load and the angle of attack. The feature is shaped to alter a flow of air between the aircraft body and the airfoils. Altering the flow of air also one or more of reduces the local load on the airfoils, reduces the local angle of attack of the airfoils, or reduces a noise level that is generated by the aircraft engine system as the rotatable member rotates about the axial centerline of the aircraft engine system relative to the aircraft body not including the feature.

In one embodiment, a method comprises determining a local load on plural airfoils with one or more processors. The airfoils are operably coupled with a rotatable member of an aircraft engine system. The rotatable member is configured to rotate about an axial centerline of the aircraft engine system. The method also comprises determining a local angle of attack of the airfoils with the one or more processors as air flows around the airfoils and the rotatable member rotates about the axial centerline of the aircraft engine system. The method also comprises creating a feature at one or more exterior locations of an aircraft body based on the local load and the local angle of attack. The feature is shaped to alter the flow of air between the aircraft body and the airfoils. Altering the flow of air also one or more of reduces the local load on the airfoils, reduces the local angle of attack of the airfoils, or reduces a noise level that is generated by the aircraft engine system as the rotatable member rotates about the axial centerline of the aircraft engine system relative to the aircraft body not including the feature.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the subject matter described herein relate to systems and methods that reduce a local load on airfoils of an aircraft engine system, reduce a local angle of attack of the airfoils, or reduce a noise level that is generated by the aircraft engine system. The systems and methods determine the local load on the airfoils and determine the local angle of attack on the airfoils as the airfoils rotate about an axial centerline of the aircraft engine system. Based on the local load and the local angle of attack, a feature is created at an exterior location of an aircraft body. For example, the aircraft body could be the fuselage, the wing, the pylon, the nacelle, the outer nacelle duct, or the like. The feature alters the flow of air between the airfoils and the aircraft body in order to improve the reduction of the local load on the airfoils and the local angle of attack of the airfoils. Improving the reduction of the load and the angle of attack improves the reduction of a noise level that is generated by the aircraft engine system relative to the aircraft body not including a feature.

As used herein, the terms "first", "second", or "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. Additionally, the terms "upstream" and "downstream" refer to the relative direction with respect to fluid flow in a fluid pathway. For example, "upstream refers to the direction from which the fluid flows, and "downstream" refers to the direction to which the fluid flows.

Figure 1:
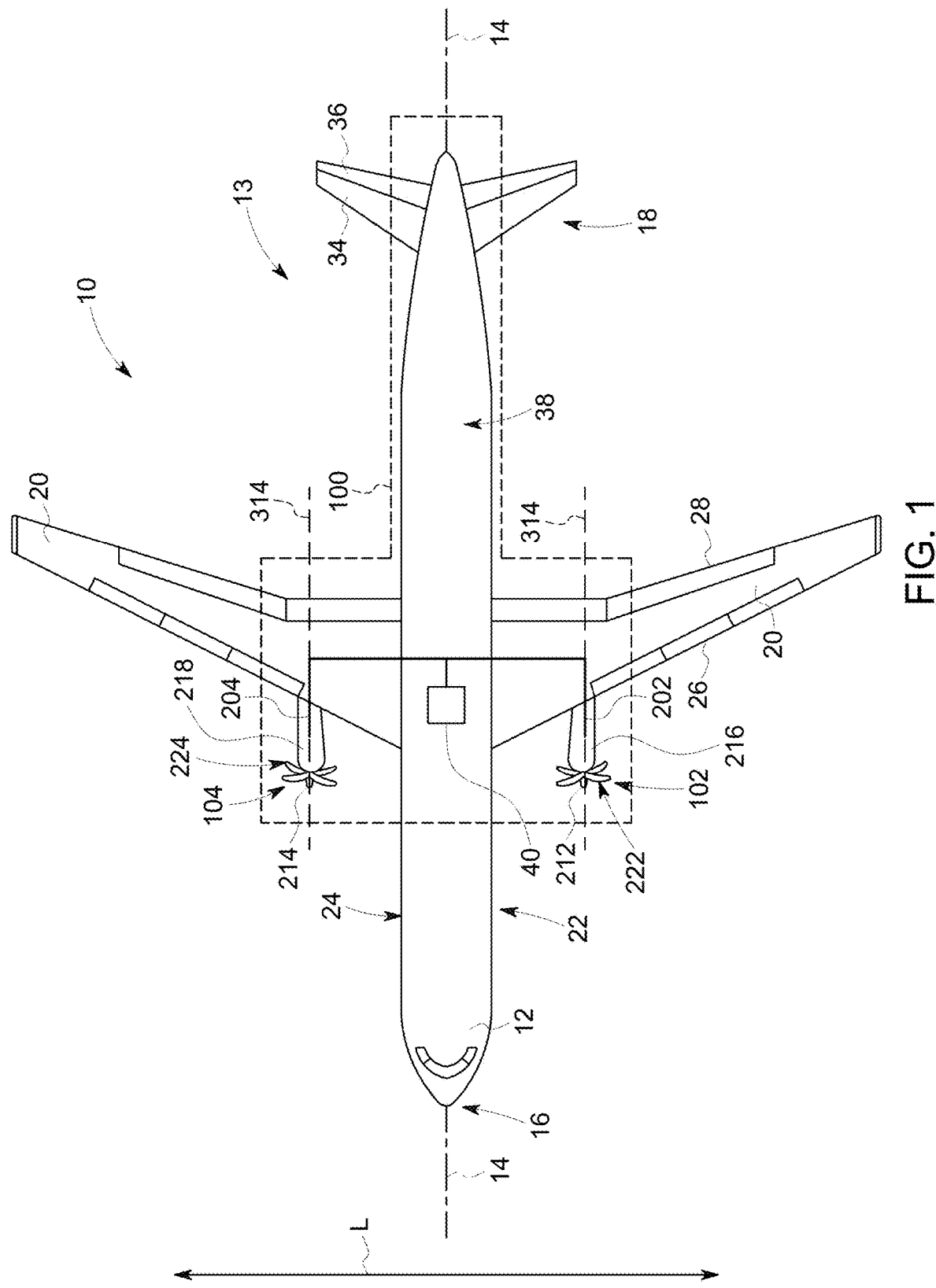
FIG. 1 illustrates a top view of an aircraft system in accordance with one embodiment.
Figure 2:
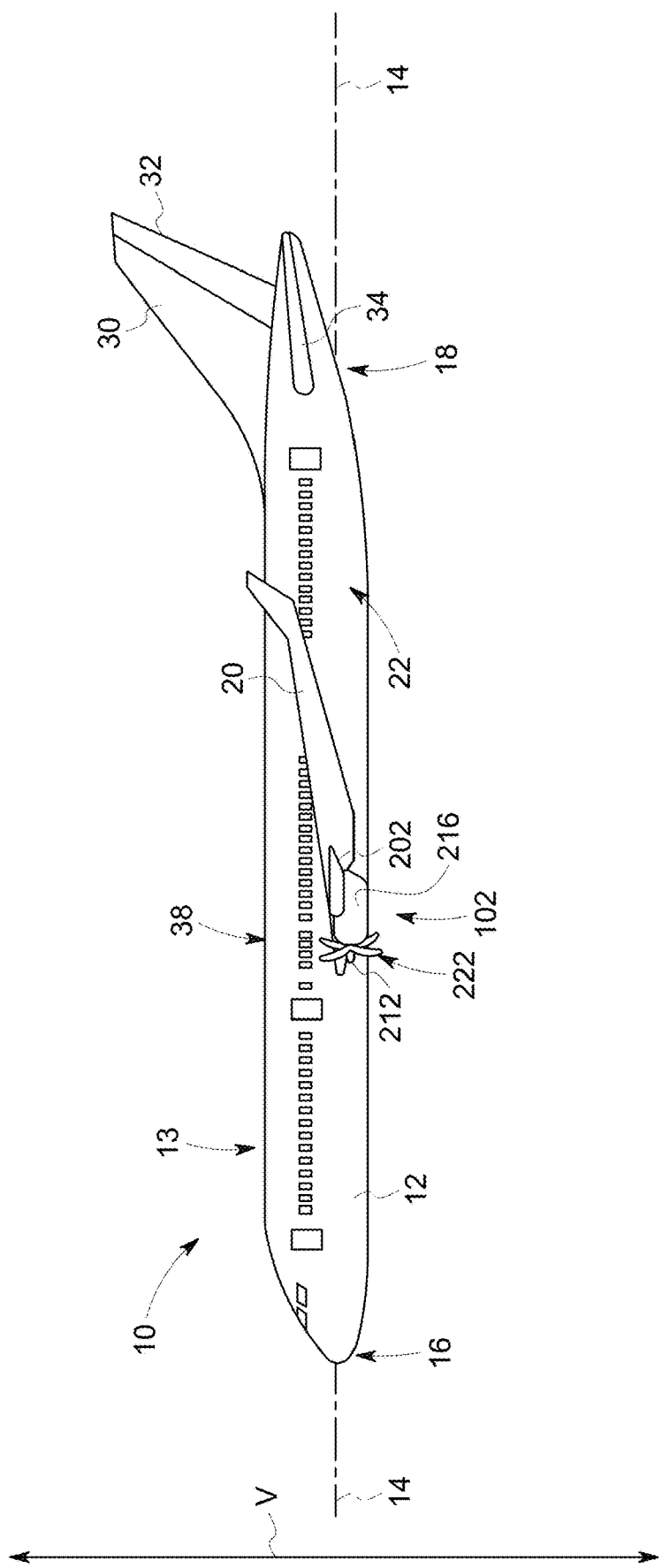
FIG. 2 illustrates a side view of the aircraft system of FIG. 1 in accordance with one embodiment.

FIG. 1 illustrates a top view of an aircraft system 10 in accordance with one embodiment. FIG. 2 illustrates a side view of the aircraft system 10 in accordance with one embodiment. FIGS. 1 and 2 illustrate one embodiment of an aircraft system 10. Alternatively, the aircraft system and/or one or more components of the aircraft system may have a different size, shape, configuration, orientation, or the like. FIGS. 1 and 2 will be discussed together in detail herein.

The aircraft system 10 includes an aircraft body 13 having a fuselage 12 that extends between a forward end 16 and an aft end 18 of the aircraft body 13 along a longitudinal direction of the aircraft body 13. The aircraft body 13 defines a longitudinal centerline 14 that extends there through a vertical direction V and a lateral direction L. As used herein, the term "fuselage" generally includes all of the body of the aircraft body 13, such as an empennage of the aircraft body 13.

The aircraft body 13 includes a pair of wings 20. A first wing extends laterally from a port side 22 of the fuselage 12 in the lateral direction L, and a second wing extends laterally from a starboard side 24 of the fuselage 12. Each of the wings 20 includes one or more leading edge flaps 26 and one or more trailing edge flaps 28. Optionally, the wings 20 may not include the leading edge flaps 26 and/or the trailing edge flaps 28. In the illustrated embodiment, the wings 20 are swept along the lateral direction L from the forward end 16 to the aft end 18. Additionally or alternatively, the wings may have any alternative sweeping or non-sweeping shape and/or size.

The aircraft body 13 includes a vertical stabilizer 30 and a pair of horizontal stabilizers 34 at the aft end 18 of the aircraft body 13. The vertical stabilizer 30 has a rudder flap 32 for yaw control, and each of the horizontal stabilizers 34 has an elevator flap 36 for pitch control of the aircraft system 10. The fuselage 12 includes an outer surface or skin 38. FIGS. 1 and 2 illustrate one embodiment of the aircraft system 10. Optionally, the aircraft system 10 may include any alternative configuration of stabilizers, wings, or the like, that may extend from the aircraft body 13 along the vertical direction V, the horizontal or lateral direction L, or in any alternative direction away from the centerline 14.

Optionally, the aircraft body 13 may be referred to herein as an aircraft body 13. The aircraft body 13 may include the structural components of the aircraft system 10 that are joined together in order to create the exterior structural shape and/or size of the aircraft system 10. For example, the aircraft body 13 may include, but is not limited to, the fuselage 12, the wings 20, flaps 26, 28, or the like, that are operably coupled together to form the shape of the aircraft system 10. Optionally, the aircraft body 13 may include any number of additional components of the aircraft system 10 described herein.

The aircraft system 10 includes an aircraft propulsion system 100. The aircraft propulsion system 100 includes a pair of aircraft engine systems 102 and 104, at least one mounted to each of the pair of wings 20. The aircraft engine systems 102, 104 include nacelles 216, 218 that are connected to the wings 20 with pylons 202, 204, respectively. In the illustrated embodiment, the engine systems 102, 104 of the aircraft propulsion system 100 are turboprop engines that are suspended beneath the wings 20 by the pylons 202, 204 in an under-wing configuration. In one or more embodiments, the engine systems 102, 104 may be mounted or coupled to the pylons 202, 204 that are attached to the fuselage 12 at any location between the forward end 16 and the aft end 18 of the aircraft system 10. Additionally or alternatively, the engine systems 102, 104 may be coupled to the aircraft body 13 by any alternative component and at any alternative location.

Each of the engine systems 102, 104 include single rotatable members or propellers 222, 224 having plural airfoils that are configured to rotate about an axial centerline 314 of each of the engine systems 102, 104. Optionally, the engine systems 102, 104 may each include dual propellers (not shown) that are configured to rotate about each corresponding axial centerline. The rotatable members 222, 224 are located aft of spinners 212, 214 along the axial centerline 314 of each engine system 102, 104, respectively. Additionally or alternatively, the aircraft propulsion system 100 may include any number of engine systems 102, 104 that may be positioned at different locations between the forward and aft ends 16, 18 of the aircraft body 13. For example, any number of engine systems may be positioned above the wings 20, may be mounted by any alternative structures, may include two or more engine systems operably coupled with each wing 20, may be located at the forward end 16 of the aircraft body 13, or may be positioned at any alternative location and/or in any other configuration. Optionally, the aircraft propulsion system 100 may include any number and/or configurations of engine systems. The engine systems 102, 104 will be described in more detail below.

The engine systems 102, 104 of the aircraft propulsion system 100 are operably coupled with a control system 40 disposed onboard the aircraft body 13. The control system 40 may include one or more processors, one or more sensing elements, input devices, output devices, data processing circuitry, network and/or communication interfaces or the like. Optionally, the aircraft system 10 may include one or more sensing elements (not shown) that are disposed at any alternative location such as, but not limited to, on or near one or more of the engine systems, near the forward end 16 and/or aft end 18 of the aircraft body 13, at a location on each of the wings 20, or the like.

The one or more processors may be one or more computer processors, controllers (e.g., microcontrollers), or other logic-based devices that perform operations and/or analysis based on one more set of instructions (e.g., software). The sensing elements may be operably coupled with the one or more processors of the control system 40 such that the one or more processors may analyze data that is received from the sensing elements. For example, the one or more processors may analyze sensor data that received from one or more sensing elements in order to determine a condition of one or more components, systems, or the like, of the aircraft system 10. Optionally, in one embodiment, the control system 40 may wirelessly communicate the sensor data between the control system 40 and a location off-board the aircraft system 10. For example, the processors may communicate the sensor data to a control tower and/or a control center, may communicate the sensor data to a cloud storage system, or the like. Additionally, the control system 40 may receive sensor data, analyzed data, commands, or the like, from a control tower, control center, from a cloud storage system, or the like.

In one or more embodiments, the engine systems 102, 104 of the aircraft propulsion system 100 may be operably coupled with one or more additional systems in order to provide power to the aircraft system 10. The aircraft propulsion system 100 may include one or more electric generators, energy storage devices, electric motors, or the like (not shown). For example, one or more of the engine systems 102, 104 may provide mechanical power from a rotating shaft (e.g., a low-pressure shaft or high-pressure shaft) to the electric generator and/or an electric storage device.

Figure 3:
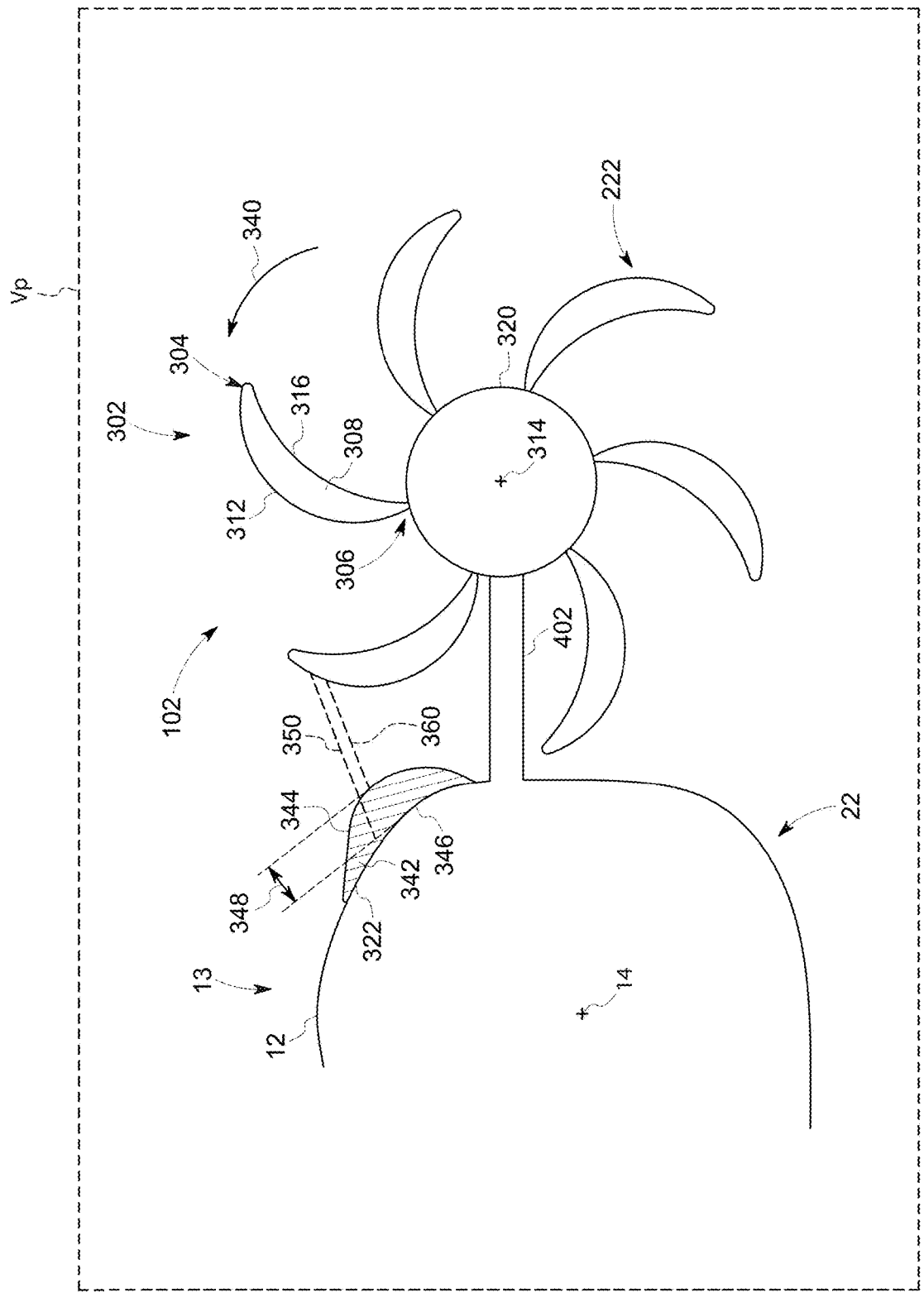
FIG. 3 illustrates a partial front view of an aircraft engine system in accordance with one embodiment.
Figure 4:
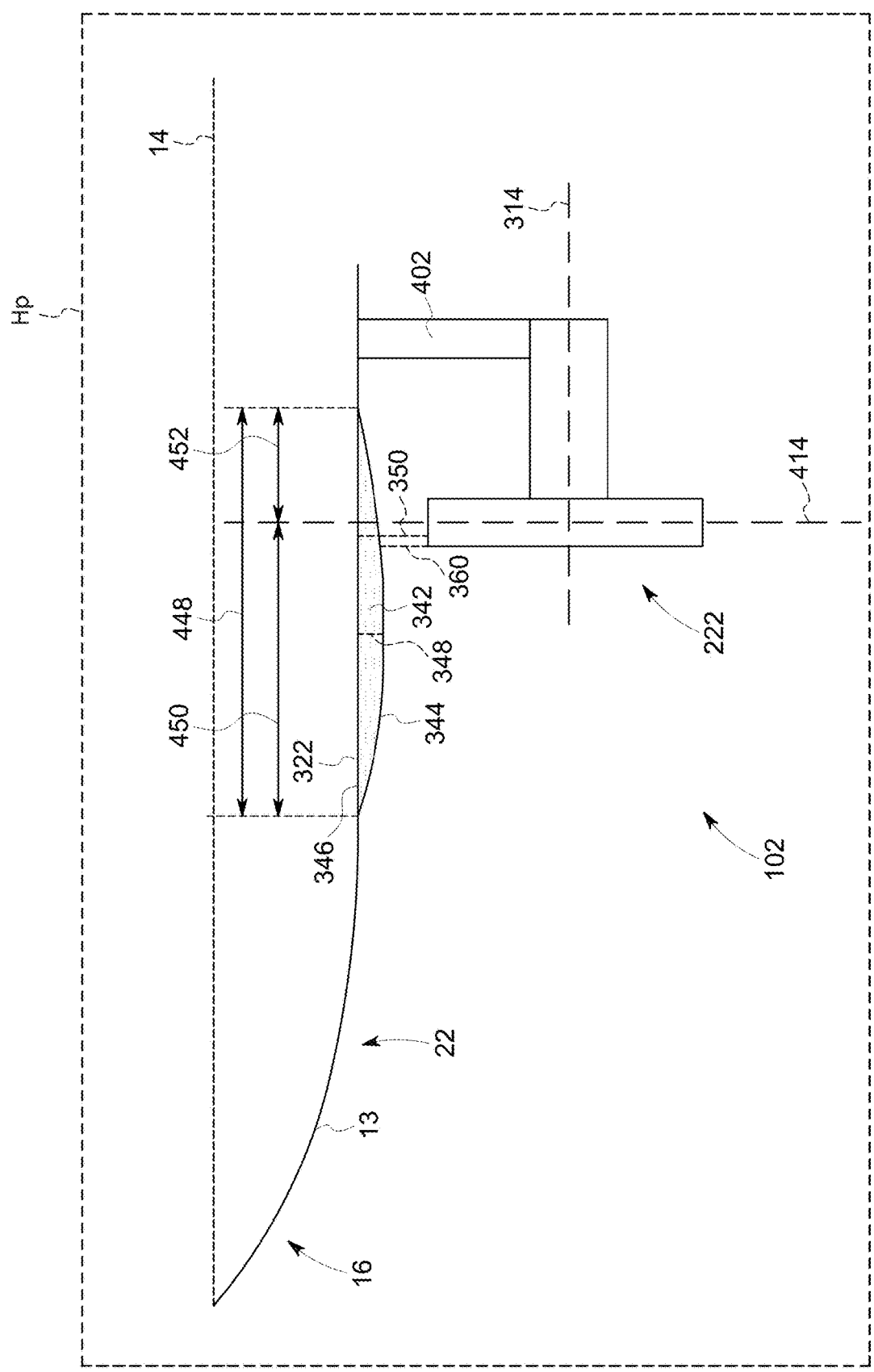
FIG. 4 illustrates a partial top view of the aircraft engine system of FIG. 3 in accordance with one embodiment.

FIG. 3 illustrates a partial front view of the aircraft engine system 102 in accordance with one embodiment. FIG. 3 is viewed along a vertical plane (Vp) that is perpendicular to the longitudinal centerline 14 and interests a feature 342 that is provided on an exterior location of the fuselage 12. FIG. 4 illustrates a partial top view of the aircraft engine system 102 in accordance with one embodiment. FIG. 4 is viewed along a horizontal plane (Hp) that extends along the centerline 14 and intersects the feature 342. FIGS. 3 and 4 will be discussed together herein. In the illustrated embodiment of FIGS. 3 and 4, the aircraft engine system 102 is a turboprop engine system 102 that includes a rotatable member 222 that is mounted to the port side 22 of the fuselage 12 with a pylon 402. Additionally or alternatively, the engine system 102 may be wing-mounted to the aircraft body 13 or may be mounted by any alternative method. While only the details of the engine system 102 are illustrated, the engine system 104 (of FIG. 1) may have the same or a substantially similar configuration as the engine system 102.

The engine system 102 is disposed on the port side 22 of the aircraft body 13. The engine system 102 includes the propeller 222 that is configured to rotate about the axial centerline 314 of the engine system 102. As used herein, the propeller 222 may also be referred to as a rotatable member 222. For example, the rotatable member 222 includes an axle (not shown) that is configured to extend along and rotate about the axial centerline 314.

The rotatable member 222 includes plural airfoils 302 that are disposed common distances apart from each other radially about the axial centerline. In the illustrated embodiment, the rotatable member 222 includes six airfoils 302. Optionally, the rotatable member 222 may include any number of airfoils 302.

Each of the airfoils 302 has a free end 304 and an opposite base end 306. The free end 304 and the base end 306 are interconnected by a leading edge 312 and a trailing edge 316 that is opposite the leading edge 312. For example, the leading edge 312 is the edge or surface of the airfoil 302 that meets the flow of air first before the trailing edge 316 as the rotatable member 222 rotates in a direction 340 about the axial centerline 314. The base end 306 of each airfoil 302 is operably coupled with and configured to rotate with a hub 320. The hub 320 is generally centered about the axial centerline 314 of the engine system 102. The free end 304 of each airfoil 302 radially extends a distance away from the hub 320. In the illustrated embodiment, the airfoils 302 extend a common distance away from the hub 320. Additionally or alternatively, one or more of the airfoils 302 may extend to any alternative common or unique distance.

The pylon 402 is operably coupled with the hub 320 and extends a distance in a direction towards the port side 22 of the aircraft body 13. In the illustrated embodiment, the pylon 402 extends in a direction that is substantially perpendicular to the axial centerline 314. Optionally, the pylon 402 may extend in any alternative direction between the hub 320 and the aircraft body 13. The pylon 402 interconnects the hub 320 of the rotatable member 222 with the fuselage 12. Additionally or alternatively, the rotatable member 222 may be operably coupled with the aircraft system 10 by any alternative methods.

The rotatable member 222 is configured to rotate in the direction 340 about the axial centerline 314 of the engine system 102. Optionally, the rotatable member 222 may rotate in a direction opposite the direction 340 about the axial centerline 314. Additionally or alternatively, the aircraft system 10 may include multiple engine systems (e.g., two or more engine systems disposed on the port side of the aircraft body 13, and two or more engine systems disposed on the starboard side 24 of the aircraft body 13). For example, the first engine system on the port side that is disposed closer to the aircraft body 13 relative to the second engine system on the port side may have a rotatable member that is configured to rotate in the direction 340, and the second engine system may have a rotatable member that is configured to rotate in a direction opposite the direction 340.

The fuselage 12 on the port side 22 of the aircraft system 10 includes the feature 342. Optionally, the feature 342 may also be referred to herein as a structure, a body, or the like. The feature 342 has a first surface 344 and an opposite second surface 346. In the illustrated embodiment, the second surface 346 is operably coupled with an exterior surface 322 of the fuselage 12 and the first surface 344 protrudes a distance 348 away from the exterior surface 322 of the fuselage 12. For example, the feature 342 may be referred to as a bump, protrusion, or the like, that protrudes the distance 348 radially away from the exterior surface 322 of the fuselage 12. Optionally, the feature 342 may extend a distance into the fuselage 12 (not shown). For example, the feature 342 may be referred to as a depression, dimple, indent, absence, or the like, that extends a distance radially into the exterior surface 322 of the fuselage 12.

In the illustrated embodiment, the first surface 344 includes a contour that has a generally spherical shape. Optionally, the first surface 344 may include any alternative shape such as a geometric shape such as conical, cylindrical, or the like, or may include an arbitrary shape or surface of revolution. For example, the feature 342 may have any shape and/or size that extends into and/or protrudes away from the aircraft body 13. The contour may extend into the aircraft body 13 at a first location of the feature 342 and then protrude away from the aircraft body 13 at a different, second location of the feature 342 in a direction along the longitudinal centerline 14 (of FIG. 1), may protrude away from the aircraft body 13 and then extend into the aircraft body 13 along a direction normal to the surface of the fuselage 12, may have a uniform or non-uniform wavy or bulging shape in one or more directions, or any combination therein. Additionally or alternatively, the first surface 344 may include any number of common and/or unique contours having any shape and/or size, may be disposed at any exterior location on the aircraft body 13, or the like.

The structure or feature 342 extends a distance 448 along the longitudinal centerline 14 of the aircraft body 13. The feature 342 extends a first distance 450 forward of a propeller plane 414 and extends a second distance 452 aft of the propeller plane 414 along the longitudinal centerline 14. In the illustrated embodiment, the first distance 450 is greater than the second distance 452 such that a first portion of the feature 342 is disposed forward of the propeller plane 414 and a second portion of the feature 342 is disposed aft of the propeller plane 414. Optionally, all or most of the feature 342 may be disposed forward of or aft of the propeller plane 414, may be generally centered about the propeller plane 414, may protrude away from the fuselage 12 forward of the propeller plane 414 and may extend into the fuselage 12 aft of the propeller plane 414, may extend into the fuselage 12 forward of the propeller plane 414 and may protrude away from the fuselage 12 aft of the propeller plane 414, or any combination therein. Additionally or alternatively, the feature 342 may extend a distance in a different direction that is not along the longitudinal centerline 14 of the aircraft body 13. For example, the feature 342 may be disposed at a different location of the aircraft body 13 and extend in one or more different directions.

In one or more embodiments, the structure or feature 342 and/or the first surface 344 may dynamically change, flex, move, or the like. For example, the first surface 344 of the feature 342 may have a first shape during take-off of the aircraft system 10, and may morph or change to have a different, second shape when the aircraft system 10 is in cruise.

In one embodiment, the feature 342 is integrally formed with the fuselage 12. For example, the feature 342 may be formed with the fuselage 12 as a unitary body. Optionally, the feature 342 may be a separate component that is operably coupled with the exterior surface 322 of the fuselage 12 by any fastening method. For example, the feature 342 may be retrofitted to the aircraft body 13 of an aircraft system 10 that has been used in a testing mode, operational mode, or the like. Additionally or alternatively, the exterior surface 322 of the fuselage 12 may be cut into or removed in order to create the feature 342 that extends into the exterior surface 322 of the fuselage 12 (e.g., a depression, dimple, indent, absence, or the like). Optionally, the feature 342 that either extends into or protrudes away from the aircraft body 13 may be formed with and/or into one or more exterior surfaces of the aircraft body 13 by any alternative method.

The engine system 102 is disposed at a position on the pylon 402 such that the airfoils 302 and the exterior surface 322 of the fuselage 12 are separated by a baseline distance 350. Additionally, in the illustrated embodiment, the airfoils 302 and the first surface 344 of the feature 342 are separated by a feature distance 360 that is less than the baseline distance 350. Optionally, the feature 342 may extend into the fuselage such that the feature distance 360 is greater than the baseline distance 350. As the rotatable member 222 rotates about the axial centerline 314 of the engine system 102, air flows around the airfoils 302 and air flows between the airfoils 302 and the aircraft body 13. The feature 342 is configured to alter the flow of air that flows between the airfoils 302 and the aircraft body 13 (e.g., the fuselage 12). For example, the feature 342 may alter the axial flow velocity of the air, may create transverse flow, or the like.

In the illustrated embodiment, the feature 342 protrudes away from the exterior surface 322 of the fuselage 12 such that the feature alters the flow by constricting the flow of air between the airfoils 302 and the fuselage 12. For example, the feature 342 alters the flow of air between the airfoils 302 and the fuselage 12 relative to a fuselage 12 that does not include the feature 342. Constricting the flow of air between the airfoils 302 and the fuselage 12 accelerates the flow of air between the airfoils 302 and the fuselage 12. Additionally, the feature 342 protruding away from the fuselage 12 creates transverse flow between the airfoils 302 and the aircraft body 13. Optionally, in one or more embodiments the feature 342 may extend a distance into the exterior surface 322 of the fuselage 12 such that the feature alters the flow of air between the airfoils 302 and the fuselage 12. For example, the feature 342 that extends into or depresses the exterior surface 322 of the fuselage 12 may dilate the flow of air between the airfoils 302 and the fuselage 12. Additionally or alternatively, the feature may include plural contours that protrude away from and extend into the aircraft body 13 such that the feature may alter the flow of air by constricting and dilating the flow of air between the airfoils 302 and the aircraft body 13.

In one or more embodiments, the structure or feature 342 may be disposed at an exterior location on the nacelle 216, the pylon 202, or the wing 20 of FIGS. 1 and 2, on the pylon 402 of FIG. 3, or any alternative exterior location of the aircraft body 13 (not shown). The feature 342 may include any number of contours that may protrude away from and/or extend into an exterior location of the aircraft body 13 such that the feature 342 changes the flow of the air around the aircraft body 13. For example, the feature 342 may alter the flow of air between the airfoils 302 and aircraft body 13 around or near the exterior location of the feature 342. Additionally or alternatively, two or more features 342 may be disposed at different exterior locations of the aircraft body 13. For example, a first feature 342 may be disposed at a location of the fuselage 12 and a second feature 342 may be disposed at a location of the nacelle 216, the first and second features 342 may be disposed at two different locations of the fuselage 12 or two different locations of the nacelle 216, or the like. Optionally, the two or more features 342 may have common or unique shapes, that extend into and/or protrude away from the exterior location, or any combination therein.

Figure 5A:
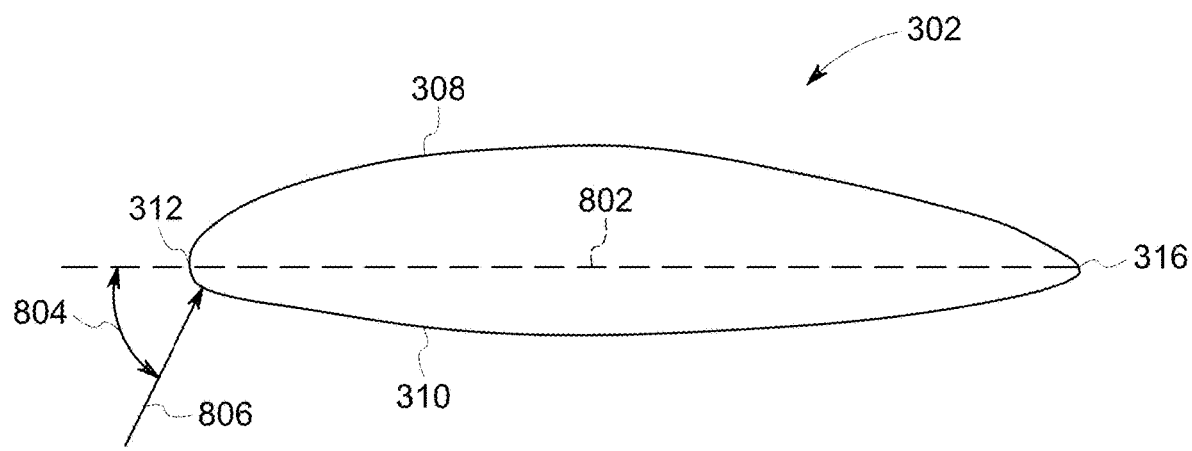
FIG. 5A illustrates a side view of an airfoil in accordance with one embodiment.
Figure 5B:
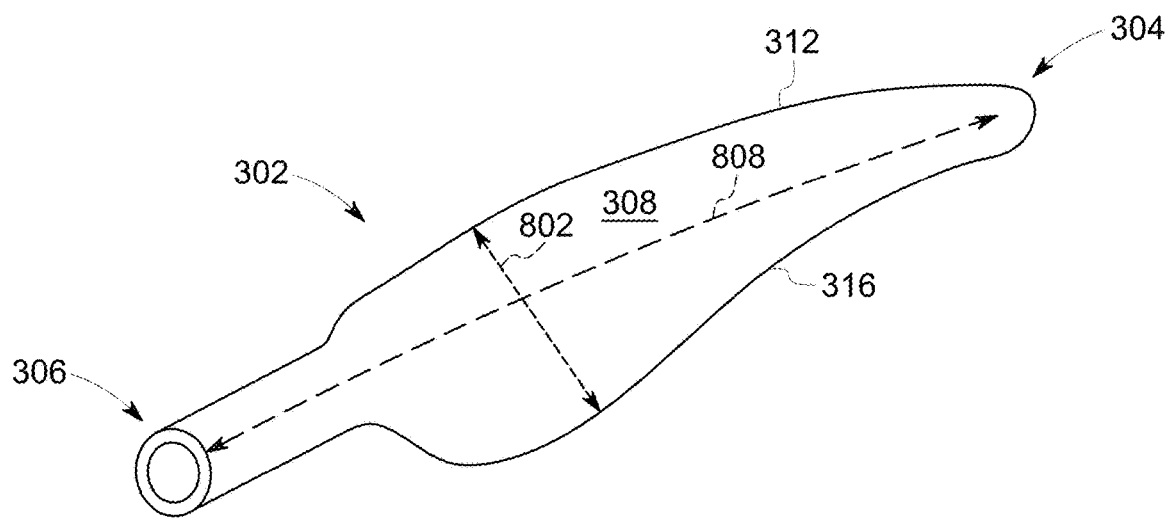
FIG. 5B illustrates a perspective view of the airfoil of FIG. 5A in accordance with one embodiment.

FIG. 5A illustrates a cross-sectional side view of one of the airfoils 302 in accordance with one embodiment. FIG. 5B illustrates a perspective view of the airfoil 302. Each of the airfoils 302 has a pressure side 310 and a suction side 308 that is opposite the pressure side 310. The pressure side 310 and the suction side 308 are interconnected by the leading edge 312 and the trailing edge 316 that is opposite the leading edge 312. The pressure side 310 is generally concave in shape, and the suction side 308 is generally convex in shape between the leading and trailing edges 312, 316. For example, the generally concave pressure side 310 and the generally convex suction side 308 provide an aerodynamic surface over which fluid flows through the rotatable member 222 of the engine system 102. Optionally, the airfoils 302 may have an alternative curvature and/or shape.

In the illustrated embodiment, an angle of attack 804 of the airfoil 302 corresponds to an angle defined between a camber line 802 and a flow vector 806 representing the relative motion between the airfoil 302 and the surrounding air. The camber line 802 defines the length of the airfoil 302 between the leading edge 312 and the trailing edge 316. Optionally, the camber line 802 may vary in length at various locations of the airfoil 302 along a radial length of the airfoil 302. The feature 342 is shaped and sized in order to change the local angle of attack of the airfoils 302. For example, the feature 342 may alter the flow of air between the free end 304 of the airfoil 302 and the aircraft body 13. Altering the flow of air changes (e.g., makes smaller, makes larger, or the like) the local angle of attack 804 of the airfoil 302 relative to the aircraft body 13 not including a feature. Additionally, altering the local angle of attack 804 alters the local aerodynamic load on the airfoils 302 and alters the noise level generated by the airfoils 302 of the engine system 102. Altering the local angle of attack will be discussed in more detail below with FIGS. 7A and 7B.

Additionally, altering the local angle of attack alters the thrust generated by the airfoils 302 and the engine system 102. For example, as the airfoils 302 pass or sweep near the fuselage 12 (e.g., relative to the airfoils 302 sweeping away from the fuselage 12 rotating in the direction 340), the feature 342 locally modifies or alters the flow field between the airfoils 302 and the aircraft body 13 in order to modify the local angle of attack 804 of the airfoils 302 and reduce the lift or thrust on airfoils 302. In the illustrated embodiment of FIG. 3, the feature 342 alters the flow of air by constricting the flow of air between the airfoils 302 and the aircraft body 13 (e.g., constricting the flow of air accelerates the flow of the air between the airfoils 302 and the aircraft body 13) and locally reduces the angle of attack 804 of the airfoils 302. Reducing the local angle of attack 804 causes the thrust generated by the engine system 102 to reduce. Alternatively, increasing the local angle of attack 804 causes the thrust generated by the engine system 102 to increase.

In order to compensate for the average thrust reduction due to the feature 342 altering the flow of air, the airfoils 302 may be redesigned and/or reoriented to a slightly more open pitch setting where the average angle of attack is higher relative to the airfoils 302 oriented to a more closed pitch setting to recover the lost thrust. However, the noise (e.g., the acoustic waves emanating from the tip of the airfoil 302) that is radiated in a direction towards the fuselage 12 is reduced due to the feature 342 relative to the fuselage that does not include the feature 342 due to the local angle of attack to the propeller (e.g., the rotatable member 222) at a location near the fuselage 12 since the noise is a strong function of the loading of the propeller positioned near and rotating toward the fuselage 12. Additionally or alternatively, a different, second feature may be placed on an exterior surface of the nacelle in order to increase the local angle of attack and the thrust of an airfoil that is further away from the fuselage 12 to maintain the average thrust. Optionally, the feature 342 may be placed on an alternative exterior surface of the aircraft body 13 in order to change the local angle of attack and the thrust of the airfoil that is close to or far away from the feature 342.

Figure 6:
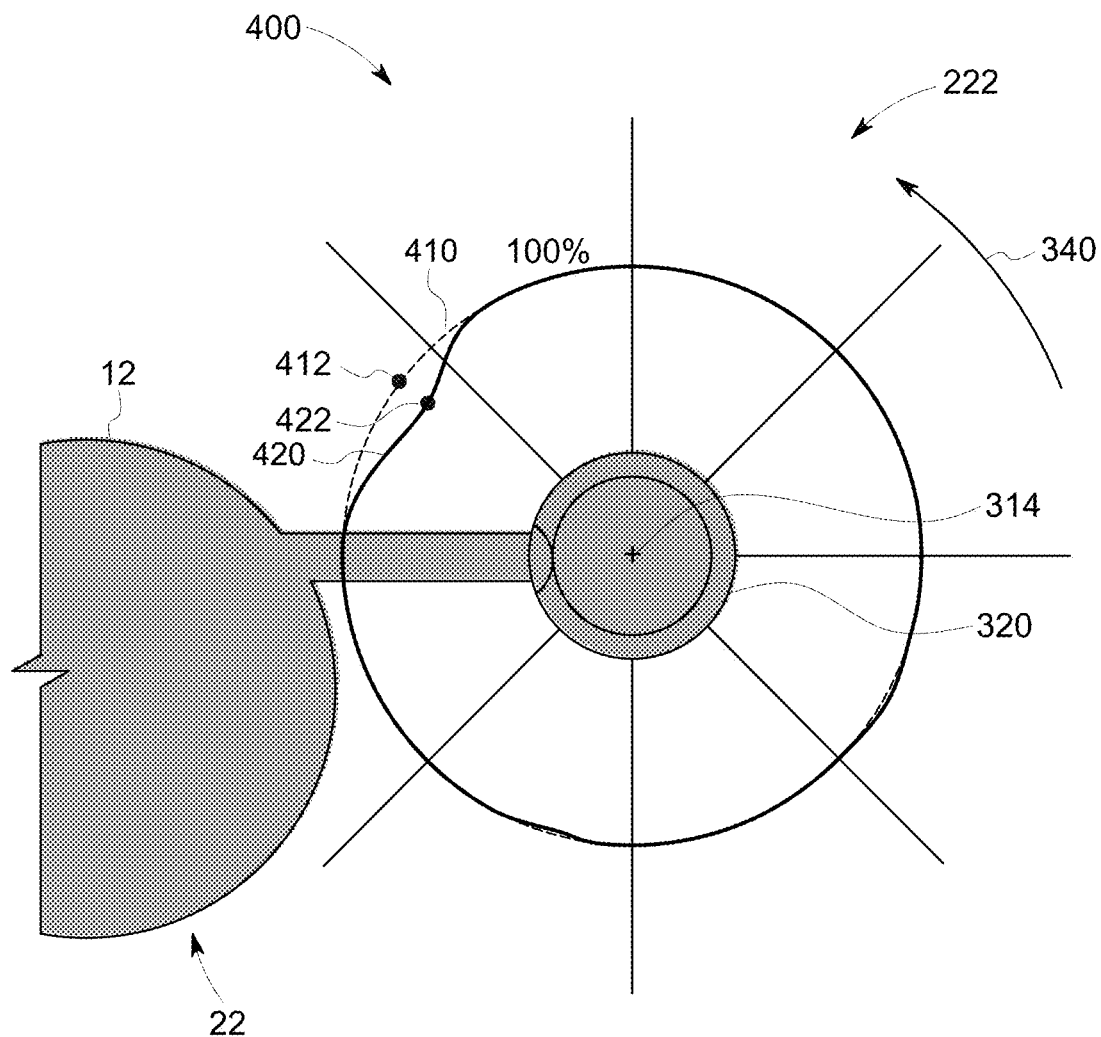
FIG. 6 illustrates an airfoil aerodynamic load graph in accordance with one embodiment.

The shape, size, and location of the structure or feature 342 may be determined by obtaining sensor data from one or more sensing elements onboard and/or off-board the aircraft system 10, a computer model, a combination therein, or the like. For example, a fluid dynamic analysis may be completed by the one or more processors of the control system 40 (of FIG. 1), by one or more processors of a control system off-board the aircraft system 10, or the like. An airfoil aerodynamic load graph illustrating the airfoil load analysis will be discussed in more detail below with FIG. 6. The airfoil aerodynamic load graph illustrated in FIG. 6 illustrates the results of one such fluid dynamic analysis. Alternatively, the feature having an alternative shape and/or size and disposed at any other exterior location of the aircraft body 13 (e.g., the wings 20, the pylon, the nacelle, the outer nacelle duct, or the like) may generate different airfoil aerodynamic load graphs and different fluid graphs.

FIG. 6 illustrates an airfoil aerodynamic load graph 400 in accordance with one embodiment. The graph 400 illustrates a thrust on each airfoil 302 as the airfoils 302 and the rotatable member 222 rotate in the direction 340 about the axial centerline 314 of the engine system 102. For example, the load or thrust may be determined on the free ends 304 of each airfoil 302, the base ends 306 of each airfoil 302, on substantially the entire length of each airfoil 302, or any combination therein. A baseline or nominal load line 410 illustrates the measured or calculated load on each of the airfoils 302 when the engine system 102 is installed on the aircraft system 10. The nominal load line 410 is for illustrative purposes only, and although is shown here in FIG. 6 as circumferentially constant, it may vary with angular position in reality due to installation effects.

As the airfoils 302 rotate about the axial centerline, noise radiates from the airfoils 302 towards and away from the fuselage 12. A point 412 on the nominal load line 410 identifies a location from which the highest levels of noise from the airfoils 302 are radiated towards the fuselage 12. The feature 342 (not shown in FIG. 6) modifies the local angle of attack and local loading of the airfoils 302 resulting in a load variation shown by line 420, with a reduction in the local loading denoted by a point 422 on line 420.

Figure 7A:
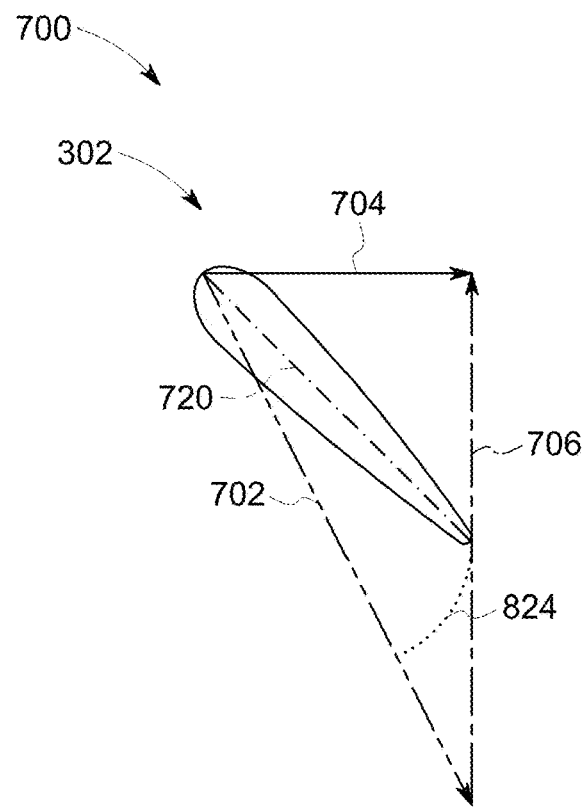
FIG. 7A illustrates a baseline angle of attack on an airfoil in accordance with one embodiment.
Figure 7B:
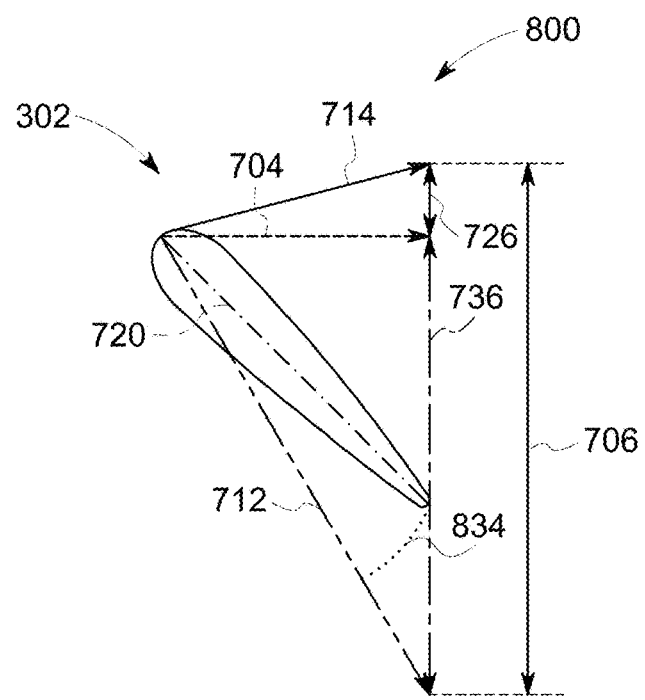
FIG. 7B illustrates a changing angle of attack on an airfoil in accordance with one embodiment.

FIG. 7A illustrates a baseline velocity vector configuration 700 of the airfoil 302 with the aircraft body 13 not including the feature 342. FIG. 7B illustrates a changing velocity vector configuration 800 of the airfoil 302 with the aircraft body 13 having the feature 342. FIGS. 7A and 7B will be discussed together herein.

In one or more embodiments, the aircraft feature 342 or structure may induce perturbed flow velocity that projects to both axial and tangential coordinates in the propeller frame of reference. For example, the shape, size, and/or positioning of the feature 342 may change the loading on the airfoils 302 by increasing one or more of the axial velocity, circumferential flow velocity (e.g., in a direction towards the airfoil rotation), or the like.

The baseline velocity vector configuration 700 of the airfoil 302 of FIG. 7A includes a baseline relative flow velocity vector 702 in a rotating frame of reference of the airfoil 302, a baseline axial velocity vector 704, a baseline rotational or circumferential velocity vector 706, and a baseline angle of attack 824 relative to the baseline relative flow velocity vector 702 and a chord line 720 of the airfoil 302. The baseline configuration 700 illustrates the baseline velocity vectors with respect to the airfoil 302 as the airfoils rotate about the axial centerline 314 of the engine system 102 when the aircraft body 13 does not include a feature 342.

The changing velocity vector configuration 800 of the airfoil 302 of FIG. 7B includes a relative flow velocity vector 712, an absolute velocity vector 714, a transverse or normal velocity perturbation vector 726 induced by the feature 342, a rotational velocity vector 736, and a second angle of attack 834 relative to the relative flow velocity vector 712 and the chord line 720 of the airfoil 302. The configuration 800 illustrated in FIG. 7B may illustrate the velocity vectors with respect to the airfoil 302 as the airfoils rotate about the axial centerline 314 of the engine system 102 when the aircraft body 13 includes the feature 342.

The feature 342 induces a velocity perturbation that perturbs the circumferential velocity from the baseline rotational velocity vector 706 to the rotational velocity vector 736. Perturbing the rotational velocity changes the position of the rotational velocity from the baseline rotational velocity vector 706 to the rotational velocity vector 736. While the magnitude of the baseline rotational velocity vector 706 remains substantially unchanged, (e.g., the propellers 222 rotate at a fixed revolutions-per-minute), the aircraft feature 342 induces the perturbed relative velocity from the baseline relative velocity vector 702 to the relative velocity vector 712, thereby reducing the second angle of attack 834. For example, the feature 342 reduces the angle of attack from the baseline angle of attack 824 to the second angle of attack 834 by increasing the axial velocity. Optionally, the feature 342 may be shaped and/or sized, and/or disposed in one or more locations of the aircraft body 13 such that the feature 342 may change the local angle of attack of the airfoils 302.

In one or more embodiments, the feature 342 may change (e.g., increase or decrease) the local aeromechanical load on the airfoils 302. For example, the feature 342 may alter or change the flow of air between the airfoils 302 and the feature 342 such that the feature 342 reduces the variable angle of attack distortion that is experienced by the airfoils 302 due to aircraft installation effects relative to the aircraft body 13 that does not include the feature 342. The airfoils 302 of the engine systems 102, 104 that are operably coupled with the aircraft system 10 may experience a variation in thrust and/or aeromechanical loads on the airfoils 302. The feature 342 may be shaped and/or sized such that the feature 342 may reduce the variation in the thrust and/or aeromechanical loads on the airfoils 302 relative to the aircraft system 10 that does not include the feature 342. For example, the feature 342 may be designed in order to minimize unsteady forces for the airfoils 302 structural aeromechanics, in order to reduce the variation in loads on the airfoils 302 as the airfoils 302 rotate about the axial centerline 314, or the like, relative to an aircraft system 10 that does not include the feature 342.

Optionally, in one or more embodiments, the aircraft system 10 may include a turbojet engine system having a nacelle with inlet and outlet guide vanes and a rotatable member having fan blades (not shown). The aircraft system may include a feature that is disposed on one or more surfaces of the nacelle of the turbojet engine. For example, the feature may change or alter the flow of air through the inlet guide vanes, the rotatable member, and the outlet guide vanes. The feature may alter the air that flows between the surface of the nacelle and the vanes and/or blades such that the feature may reduce a variable aeromechanical load on the vanes and/or blades, reduce a noise level that is generated by the turbojet engine system, may reduce a local angle of attack on the vanes and/or blades, or the like, relative to the aircraft system not including the feature. Optionally, the position or pitch of the stationary vanes may be changed in order to counter the change in thrust generated by the blades due to feature reducing the local angle of attack on the blades.

As illustrated in FIGS. 6, 7A and 7B, as the airfoils 302 sweep through or pass near by the fuselage 12, the structure or feature 342 alters the flow of air between the airfoils 302 and the fuselage 12. Altering the flow of air between the airfoils 302 and the fuselage 12 changes the angle of attack of the airfoils and changes the local aerodynamic load on the airfoils 302 relative to the aircraft body 13 not including the feature 342. For example, altering the flow of air between the airfoils 302 and the aircraft body 13 (e.g., the fuselage 12 in the illustrated embodiment) with the feature 342 alters the aerodynamic load on the airfoils 302 and alters the angle of attack experienced by the airfoils 302 of the propeller 222 as the airfoils 302 rotate with the rotatable member 222. For example, the varying aerodynamic load on the airfoils 302 and the angle of attack of the airfoils 302 are influenced by at least the aircraft body 13, including the shape of the fuselage 12, the shape of the feature 342, or a combination therein. Additionally, the varying aerodynamic load and the local angle of attack of the airfoils 302 are influenced by the transverse flow created or generated by the feature 342 protruding away from the aircraft body 13. For example, the transverse flow reduces the local angle of attack of the airfoils relative to the aircraft body 13 not including the feature 342.

In one or more embodiments, altering the flow of air between the airfoils 302 and the aircraft body 13 with the feature 342 reduces the local load on the airfoils 302 and reduces the local angle of attack of the airfoils 302 relative to the aircraft body 13 not including the feature 342 when the aircraft system 10 is cruising, climbing, descending, accelerating, and/or decelerating.

In one or more embodiments, the fluid dynamic analysis may be performed multiple times in order to determine the shape, size, and/or location of the feature 342 in order to change a noise level that is generated by the engine systems 102, 104 of the aircraft propulsion system 100 to a target noise level. Altering the flow of air around the airfoils 302 and between the airfoils 302 and the aircraft body 13 reduces a noise level that is generated by the engine system 102 relative to the aircraft body 13 not including a feature. The shape, size, and/or location of the feature 342 may be determined in order to reduce the noise level that is generated by the engine system 102 to a target noise level, or a target noise level range, when the aircraft system 10 is cruising, climbing, descending, accelerating, and/or decelerating.

Additionally, the aerodynamic analysis may be performed multiple times in order to determine the shape, size, and/or location of the feature 342 in order to minimize the variation in the aerodynamic loads exerted onto the airfoils 302 as the installed airfoils 302 rotate about the axial centerline 314 of the engine system 102. For example, the flow of the air around the aircraft body 13 may generate varying loads that are exerted onto the airfoils 302 as a result of the aircraft body 13 distorting the flow of air around the aircraft body 13 as the aircraft system 10 operates in a cruising mode, accelerates, or decelerates. The one or more features 342 may be shaped and/or sized, and the location of the one or more features 342 may be determined in order to reduce the variation in the loads on the airfoils 302 relative to the aircraft system 10 that does not include the features 342.

Figure 8:
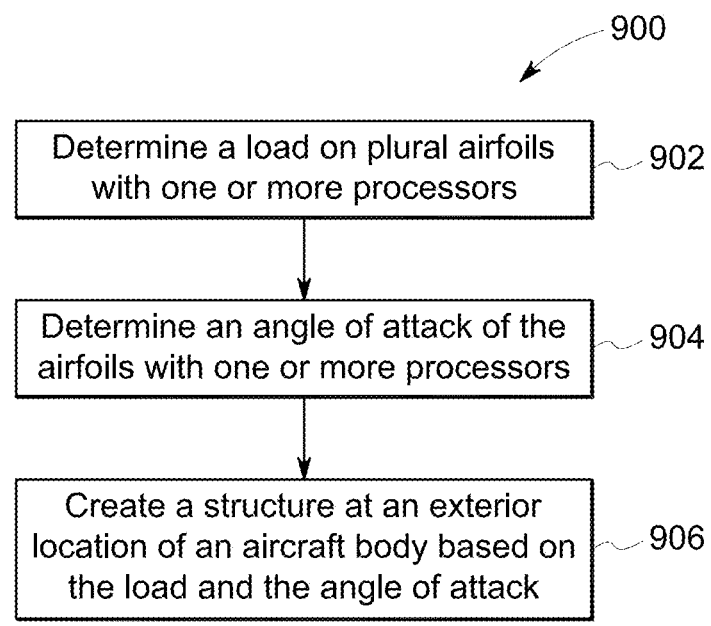
FIG. 8 illustrates a flowchart of a method in accordance with one embodiment.

FIG. 8 illustrates a flowchart of a method for reducing a noise level and/or for locally reducing a variable angle-of-attack distortion that is generated by an aircraft engine system in accordance with one embodiment. At 902, one or more processors determine a local load on plural airfoils operably coupled with a rotatable member of an aircraft engine system. In one example, one or more processors off-board the aircraft system 10 may determine a local load on the airfoils 302 of a computer model of an assembled aircraft system 10 when the engine system 102 is installed with the aircraft body 13. The local load on the airfoils 302 may be determined with one or more processors of the control system 40 or off-board the aircraft system 10 using a simulated model of the engine system 102 installed with the aircraft system 10. For example, the one or more processors may compute, complete, generate, or the like, a simulated model of the airfoils 302 rotating about the axial centerline 314 of the engine system 102 when the engine system 102 is installed with the aircraft system 102 and/or when the engine system 102 is not installed with the aircraft system 102. Optionally, the one or more processors may determine the local load on the airfoils 302 with any alternative method.

Alternatively, in one example, one or more sensors or sensing elements may be operably coupled with the aircraft body 13, one or more of the airfoils 302, the rotatable member 222, the engine system 102, one or more of the wings 20, or the like, in order to obtain sensing data. The sensing data may be communicated to the one or more processors of the control system 40 onboard the aircraft system 10, may be communicated to one or more processors off-board the aircraft system 10 with a communication system of the control system 40, or the like. The one or more processors of the control system 40 or the one or more processors off-board the aircraft system 10 may determine a local load on the airfoils 302 with the sensing data and/or with the computer generated model as the airfoils 302 and rotatable member 222 rotate about the axial centerline 314 of the engine system 102.

At 904, one or more processors determine a local angle of attack of the airfoils 302 as air flows around the airfoils 302 and the rotatable member 222 rotates about the axial centerline 314 of the engine system 102. For example, the one or more processors may determine the local angle of attack of the airfoils 302 with the sensing data that is sensed by the one or more sensors or sensing elements. Additionally or alternatively, the one or more processors may determine the angle of attack of the airfoils 302 with a simulated model of the engine system 102 installed with the aircraft system 10. For example, one or more processors may determine the local angle of attack of the airfoils 302 with one or more simulated models of the aircraft body 13 and/or aircraft system 10 when the aircraft body 13 and/or aircraft system 10 are being designed. Optionally, the one or more processors may determine the angle of attack of the airfoils 302 with any alternative method.

At 906, a feature 342 or structure is created at one or more exterior locations of the aircraft body 13 based on the local load on the airfoils 302 and the local angle of attack of the airfoils 302. The feature 342 alters the flow of air between the airfoils 302 and the aircraft body 13 as the airfoils 302 rotate about the axial centerline 314 of the engine system 102. For example, the feature 342 may protrude a distance away from the exterior location of the aircraft body 13 in order to constrict (e.g., accelerate) the flow of air between the airfoils 302 and the aircraft body 13. Alternatively, the feature 342 may extend into the exterior location of the aircraft body 13 (e.g., depress into) in order to dilate (e.g., decelerate) the flow of air between the airfoils 302 and the aircraft body 13. Optionally, the feature 342 may include one or more contours that protrude away from, extend into, or a combination therein, the exterior location of the aircraft body 13. For example, the feature 342 may include a first contour that protrudes away from the aircraft body 13 and a second contour that extends into the aircraft body 13 such that the feature 342 locally accelerates the flow of air at the first contour and locally decelerates the flow of air at the second contour.

In one or more embodiments, the feature 342 may be operably formed with the aircraft body 13 as a unitary body with the aircraft body 13. For example, the feature 342 may be formed with the aircraft body 13 during a design process of the aircraft body 13 such that the feature 342 modifies the shape of the aircraft body 13. Optionally, the feature 342 may be a component that is separate from the aircraft body 13 and may be operably coupled with the aircraft body 13. Optionally, the feature 342 may be retrofitted to an existing aircraft body 13. For example, the feature 342 may be retrofitted to an aircraft body 13 that has been previously used for test simulations, previously used for operational use (e.g., the aircraft system 10 has been operated or flown a number of times), or the like.

The shape, size, and/or location of the feature is based on the local load on the airfoils 302 and the local angle of attack of the airfoils 302. The feature 342 may have any shape or size, and may be located at any exterior location of the aircraft body 13 in order to alter the flow of air between the airfoils 302 and the aircraft body 13. Altering the flow of air with the feature locally reduces the load on the airfoils 302, reduces the local angle of attack of the airfoils 302, and reduces the noise level generated by the engine system 102 relative to the aircraft body 13 not including the feature 342.

In one or more embodiments, the method may also include changing the position of other stationary structures proximate the airfoils 302. For example, the rotating airfoils 302 may have stationary vanes of the engine system that are disposed upstream or downstream. Locally reducing the angle of attack of the rotating airfoils 302 at or nearby the feature 342 reduces the thrust generated by the engine system 102. The position of the stationary vanes may be changed (e.g., such as by unevenly spacing or staggering, or the like) in order to increase the thrust by an amount substantially similar to the amount of thrust reduced by the feature 342 altering the flow of air.

In one embodiment of the subject matter described herein, a system includes plural airfoils operably coupled with a rotatable member of an aircraft engine system. The rotatable member is configured to rotate about an axial centerline of the aircraft engine system. The system comprises a feature at one or more exterior locations of an aircraft body. The feature is shaped to alter a flow of air between the aircraft body and the airfoils. Altering the flow of air also one or more of reduces a local load on the airfoils, reduces a local angle of attack of the airfoils, or reduces a noise level that is generated by the aircraft engine system as the rotatable member rotates about the axial centerline of the aircraft engine system relative to the aircraft body not including the feature.

Optionally, the aircraft body is one or more of a fuselage, a nacelle, a wing, or a pylon of an aircraft system.

Optionally, the feature is configured to constrict or dilate the flow of air between the aircraft body and the airfoils.

Optionally, altering the flow of air one or more of reduces the local load on the airfoils, reduces the local angle of attack of the airfoils, or reduces the noise level that is generated by the aircraft engine system during one or more of cruising, climbing, or descending of an aircraft system relative to the aircraft body not including the feature.

Optionally, reducing the local angle of attack of the airfoils reduces a variable angle of attack distortion on the airfoils relative to the aircraft body not including the feature.

Optionally, the feature includes one or more contours. The one or more contours are configured to extend into or protrude away from the aircraft body.

Optionally, the one or more contours are configured to dynamically change during one or more of cruising, climbing, or descending of an aircraft system.

Optionally, the feature is configured to one or more of be retrofitted to the aircraft body or be formed with the aircraft body during a design process wherein the feature is configured to modify the aircraft body.

In one embodiment of the subject matter described herein, a system includes one or more processors configured to determine a local load on plural airfoils. The airfoils are operably coupled with a rotatable member of an aircraft engine system. The rotatable member is configured to rotate about an axial centerline of the aircraft engine system. The one or more processors are also configured to determine a local angle of attack of the airfoils as air flows around the airfoils and the rotatable member rotates about the axial centerline of the aircraft engine system. The system also includes a feature at one or more exterior locations of an aircraft body based on the local load and the local angle of attack. The feature is shaped to alter a flow of air between the aircraft body and the airfoils. Altering the flow of air also one or more of reduces the local load on the airfoils, reduces the local angle of attack of the airfoils, or reduces a noise level that is generated by the aircraft engine system as the rotatable member rotates about the axial centerline of the aircraft engine system relative to the aircraft body not including the feature.

Optionally, the aircraft body is one or more of a fuselage, a nacelle, a wing, or a pylon of an aircraft system.

Optionally, the feature is configured to constrict or dilate the flow of air between the aircraft body and the airfoils.

Optionally, altering the flow of air one or more of reduces the local load on the airfoils, reduces the local angle of attack of the airfoils, or reduces the noise level that is generated by the aircraft engine system during one or more of cruising, climbing, or descending of an aircraft system relative to the aircraft body not including the feature.

Optionally, the feature is configured to create transverse flow of the air between the aircraft body and the airfoils. The transverse flow or the air is configured to one or more of reduce the local angle of attack of the airfoils or reduce the noise level that is generated by the aircraft engine system relative to the aircraft body not including the feature.

Optionally, reducing the local angle of attack of the airfoils reduces a variable angle of attack distortion on the airfoils relative to the aircraft body not including the feature.

Optionally, the feature includes one or more contours. The one or more contours are configured to one or more of extend into or protrude away from the aircraft body.

Optionally, the one or more contours are configured to constrict or dilate the flow of air between the aircraft body and the airfoils.

Optionally, the contours are configured to dynamically change during one or more of cruising, climbing, or descending of an aircraft system.

Optionally, the feature is configured to one or more of be retrofitted to the aircraft body or be formed with the aircraft body during a design process wherein the feature is configured to modify the aircraft body.

In one embodiment of the subject matter described herein, a method includes determining a local load on plural airfoils with one or more processors. The airfoils are operably coupled with a rotatable member of an aircraft engine system. The rotatable member is configured to rotate about an axial centerline of the aircraft engine system. The method also includes determining a local angle of attack of the airfoils with the one or more processors as air flows around the airfoils and the rotatable member rotates about the axial centerline of the aircraft engine system. The method also includes creating a feature at one or more exterior locations of an aircraft body based on the local load and the local angle of attack. The feature is shaped to alter the flow of air between the aircraft body and the airfoils. Altering the flow of air also one or more of reduces the local load on the airfoils, reduces the local angle of attack of the airfoils, or reduces a noise level that is generated by the aircraft engine system as the rotatable member rotates about the axial centerline of the aircraft engine system relative to the aircraft body not including the feature.

Optionally, reducing the local angle of attack of the airfoils reduces a variable angle of attack distortion on the airfoils relative to the aircraft body not including the feature.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft comprising:
a fuselage defining a longitudinal centerline, an aft end, and a forward end located axially forward of the aft end;
an aircraft body having an outer surface and a pair of wings extending radially outward from the fuselage, with respect to the longitudinal centerline;

at least one aircraft engine system defining an axial centerline and having a nacelle and at least one rotatable propeller configured to rotate about the axial centerline, the at least one rotatable propeller extending between a free end and a base end, with the free end being spaced radially outward from the nacelle with respect to the axial centerline, the at least one aircraft engine system being located axially closer to the pair of the wings, with respect to the longitudinal centerline, than to the aft end and the forward end; and a feature provided along a portion of the aircraft body and defining a respective portion of the outer surface, the feature being shaped to alter a flow of air between the aircraft body and the at least one rotatable propeller, the feature having a continuous contour when viewed along a vertical plane perpendicular to the longitudinal centerline and intersecting the feature;

wherein the feature forms one of either:
a depression along the aircraft body such that the continuous contour is concave with respect to the aircraft body when viewed along a horizontal plane extending along the longitudinal centerline and intersecting the feature; or
a bump along the aircraft body such that the continuous contour is convex with respect to the aircraft body when viewed along the horizontal plane extending along the longitudinal centerline and intersecting the feature;
wherein the at least one rotatable propeller is axially aligned, with respect to the axial centerline, with a respective portion of the feature.

2. The aircraft of claim 1, wherein the aircraft body is one of the fuselage, the nacelle or a pylon operably coupled to the at least one aircraft engine system.

3. The aircraft of claim 1, wherein the feature comprises:
a fore edge; and
an aft edge axially downstream of the fore edge with respect to the longitudinal centerline;
wherein a straight reference line is formed between the fore edge and the aft edge of the feature;
wherein the at least one rotatable propeller is provided a first distance between the fore edge and a propeller plane perpendicular to the axial centerline and intersecting the at least one rotatable propeller, and a second distance between the aft edge and the propeller plane; and
wherein the feature extends a height defined by a line perpendicular to the straight reference line and intersecting the feature, and the feature having a maximum height relative to the straight reference line.

4. The aircraft of claim 3, wherein the first distance is larger than the second distance.

5. The aircraft of claim 3, wherein the at least one rotatable propeller is aft of the maximum height with respect to the longitudinal centerline.

6. The aircraft of claim 3, wherein the maximum height is provided along the first distance.

7. The aircraft of claim 3, wherein the maximum height is provided along the second distance.

8. The aircraft of claim 3, wherein the straight reference line is parallel to the longitudinal centerline.

9. The aircraft of claim 3, wherein the maximum height is axially offset from the vertical plane.

10. The aircraft of claim 1, wherein at least a portion of the feature is configured to dynamically change during operation of the aircraft.

11. The aircraft of claim 10, wherein the feature further comprises a first surface and a second surface, wherein the first surface and the second surface each dynamically change during operation of the aircraft during operation the aircraft.

12. The aircraft of claim 1, wherein the feature is one of either integrally formed with the aircraft body or retrofittable to the aircraft body.

13. The aircraft of claim 1, wherein an altering of the flow of air results in at least one of a reduction in a local load on the at least one rotatable propeller or a reduction in a local angle of attack of the at least one rotatable propeller relative to the aircraft body not including the feature.

14. The aircraft of claim 13, wherein reducing the local angle of attack of the at least one rotatable propeller reduces an angle of attack distortion on the at least one rotatable propeller relative to the aircraft body not including the feature.

15. The aircraft of claim 1, wherein an altering of the flow of air results in a reduction in a noise level associated with an operation of the at least one aircraft engine system relative to the aircraft body not including the feature.

16. An aircraft comprising:
a fuselage defining a longitudinal centerline;
an aircraft body;
at least one aircraft engine system defining an axial centerline and having a nacelle and at least one rotatable propeller configured to rotate about the axial centerline, the at least one rotatable propeller extending between a free end and a base end, with the free end being spaced radially outward from the nacelle with respect to the axial centerline; and
a feature provided along a portion of the aircraft body, the feature having a cross-sectional area when viewed along a horizontal plane extending along the longitudinal centerline and intersecting the feature, the cross-sectional area defining one of either a depression extending radially toward the longitudinal centerline or a bump extending radially away from the longitudinal centerline, the feature having a continuous contour when viewed along a vertical plane perpendicular to the longitudinal centerline and intersecting the feature;
wherein the cross-sectional area of the feature is configured to dynamically change between at least a first shape during a first operation of the aircraft, and a second shape, different from the first shape, during a second operation of the aircraft; and
wherein the rotatable propeller is axially aligned, with respect to the axial centerline, with a respective portion of the feature.

17. The aircraft of claim 16, wherein the aircraft body is one of the fuselage, the nacelle or a pylon operably coupled to the at least one aircraft engine system.

18. The aircraft of claim 16, wherein the feature includes a first surface and a second surface, and wherein the first surface and the second surface each dynamically change during operation of the aircraft independently of one another.

19. The aircraft of claim 16, further comprising a controller is configured to automatically dynamically change the feature during operation of the aircraft.

20. An aircraft comprising:
a fuselage defining a longitudinal centerline;
at least one aircraft engine system defining an axial centerline and having a nacelle and at least one rotatable propeller configured to rotate about the axial centerline, the at least one rotatable propeller extending between a free end and a base end, with the free end being spaced radially outward from the nacelle with respect to the axial centerline; and a feature provided along a portion of the fuselage and extending radially toward or radially away from the longitudinal centerline and having a continuous contour when viewed along a vertical plane perpendicular to the longitudinal centerline and intersecting the feature;

wherein a shape of the feature is configured to dynamically change during operation of the aircraft.

* * * * *